United States Patent [19]
Crayton et al.

[11] 3,991,955
[45] Nov. 16, 1976

[54] AUTOMATIC FILM THREADING DEVICE

[75] Inventors: Bruce E. Crayton, Rochester; Ronald A. Phillips, Pittsford, both of N.Y.

[73] Assignee: Eastman Kodak Company, Rochester, N.Y.

[22] Filed: Oct. 9, 1975

[21] Appl. No.: 621,193

[52] U.S. Cl. ............................ 242/192; 226/95; 352/157
[51] Int. Cl.² ...................... G03B 1/04; G11B 15/32
[58] Field of Search.... 242/186, 192, 195, 206–208, 242/210; 352/72, 78 R, 124, 157, 158; 226/91, 95, 97

[56] References Cited
UNITED STATES PATENTS

| | | | |
|---|---|---|---|
| 3,134,527 | 5/1964 | Willis | 226/97 |
| 3,536,276 | 10/1970 | Bundschuh et al. | 242/192 |
| 3,544,206 | 12/1970 | Freudenschusz | 352/72 |
| 3,558,028 | 1/1971 | Bunting | 226/91 |
| 3,684,360 | 8/1972 | Pammer | 352/124 |
| 3,823,895 | 7/1974 | Jones et al. | 242/186 |

*Primary Examiner*—Leonard D. Christian
*Attorney, Agent, or Firm*—Dennis R. Arndt

[57] ABSTRACT

A film threading device for use with cameras and/or projection devices is adapted to grasp the end of the outer convolution of a roll of film, tape or the like strip and guide it toward the film gate. In operation, first and second movable members, such as belts or pulleys, engage the periphery of the wound strip. The first movable member provides the film drive causing the wound film to rotate in an unwind direction. The second movable member provides a stripping action which drives the leading edge of the wound film away from a core and the film is guided by the moving member toward the nip of a thread pressure roller and a thread drive roller. The film is then guided to the film gate.

13 Claims, 7 Drawing Figures

AUTOMATIC FILM THREADING DEVICE

BACKGROUND OF THE INVENTION

1. Field of the Invention

The invention relates to an automatic film threading apparatus for photographic apparatus.

2. Description of the Prior Art

Automatic film threading devices are known are generally include a rotary member adapted to cooperate with the outer convolution of a roll of film or strip to rotate the whole roll. During this operation, a stripper member is adapted to separate the free end of said outer convolution so as to direct it along a threading path.

A disadvantage of this type of arrangement lies in the problem of controlling the pressure of the stripping member within a prescribed range and preventing it from exerting too great a pressure on the film which can cause premature wear or even damage to the film. On the other hand, it should be appreciated that too low a pressure between the stripping member and the film could allow the leading end of the film to pass between the stripping member and the next convolution of wound film instead of being guided in the desired direction.

In addition, thin film less than 3 mils in thickness is difficult to handle. Such film has a tendency to adhere to the adjacent convolution of film, thereby making it considerably more difficult for a stripping member to separate the leading end portion of the film from the film roll. The presence of static electricity and/or dirt particles also aggravates the problem by causing the film to cling to the walls of the magazine or reel. As a result of such clinging action, there exists a greater likelihood that film damage may occur as well as many aggravating film jams.

Reliability is another area where problems have existed in the prior art for quite some time, especially in the ability to reliably thread partially loaded spools and/or cartridges. This problem has been compounded by the fact that when a threading failure is encountered, the film is frequently damaged by folding, crinkling or bending which further reduces threading reliability associative with that film for subsequent attempts at threading.

SUMMARY OF THE INVENTION

It is an object of the present invention to provide a film threading device which substantially eliminates the existing disadvantages and thus permits the use of spools and/or cartridges having varying amounts of film.

This invention can be used with various types of apparatus, such as film projectors, and is especially desirable for use with roll microfilm readers. The invention is capable of substantially eliminating the problems that previously existed when thin films were utilized. The mechanism disclosed herein is also capable of extremely high threading speeds, many times faster than those commonly encountered in conventional motion picture projectors, and with a remarkably high degree of reliability.

In accordance with a preferred embodiment of the invention, means are provided for separating the loose end of the film strip from the winding during its initial revolution(s) in the unwind direction and guiding the end of the film strip into the nip formed by a thread drive roller and a thread pressure roller, and then sensing the end of the film strip when properly positioned in the film channel guides. Upon sensing that the film is in the film channel guides, the threading device is retracted from its threading position to a standby position.

The invention and its objects and advantages will become more apparent from the detailed description of the preferred embodiments presented below.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Figure 1:
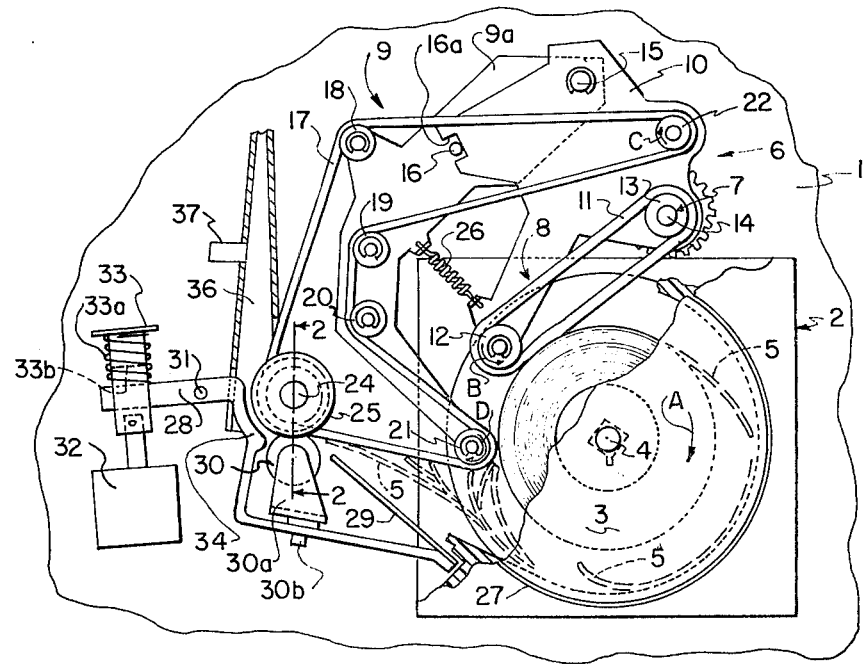
FIG. 1 is a schematic side elevational view of a portion of a film projector, such as a microfilm reader, which embodies the improved film threading mechanism of this invention, the thread arms being shown in an operative position.

Because photographic apparatus of this type are well known, the present description will be directed in particular to elements forming part of, or cooperating more directly with the present invention, apparatus elements not specifically shown or described herein being understood to be selectable from those known in the art.

Briefly, the illustrative projector comprises a vertical frame plate 1 and a magazine 2 which is loaded into position from the right and then is held in position on the plate by latching means (not shown). A film spool 3 within the magazine 2 is rotatably supported on a spindle 4. Upon unwinding of the film 5 from the spool 3 by pulling the free end of the film, the spool rotates in the clockwise direction as viewed in the drawings and as indicated by the arrow A in FIG. 1.

As is well known, film on a spool tends to clockspring, thus loosening one or more of the outer convolutions of film. These loose convolutions may adversely affect the threading operation. Therefore, it has been found to be beneficial to run the spindle 4 in the rewind mode (counterclockwise) for a very brief period (milliseconds) at the beginning of the threading cycle, thereby tightening the film 5 on the spool 3. This operation is commonly known as a "cinching" cycle.

Immediately after the cinching cycle begins, the film thread arms shown generally at 6 are pivoted against the wound film 5 to help tighten the film on the spool 3. This is accomplished by pivoting the thread arm pivot 7 in a counterclockwise direction as viewed in FIG. 1. The amount of rotation of the film thread arms 6 will depend upon the amount of film on the spool; the more film on the spool, the less the film thread arms will rotate.

The above-mentioned thread arms 6 include a drive arm 8 and a stripper arm 9 which are mounted on a common support 10, a portion of which provides support for drive arm 8 and is pivotable about the thread arm pivot 7.

The drive arm 8 comprises a support 10 on which an idler pulley 12 and a drive pulley 13 are mounted. A rubber "O" ring, or like belt 11, is trained over the pulleys. The drive arm belt 11 is substantially tangent to the outer convolution of film at the point of contact so that when the drive pulley 13 is driven in a counterclockwise direction as indicated by arrow B in FIG. 1, the belt 11 tends to drive the spool 3 of film 5 in a clockwise or unwind direction. The drive arm 8, the drive pulley 13 and the thread arm pivot 7 all pivot about the axis of shaft 14.

The stripper arm pivot 15 does not coincide with the thread arm pivot 7 even though mounted on the common support 10. The stripper arm 9 is allowed to pivot independently within limits established by the movement of a stripper arm stop 16 between the ends of a notch 16a in an edge of support 10. Pivot 15 moves with support 10 about pivot 7 as the device moves between the two positions shown in FIGS. 1 and 3.

An "O" ring or like belt 17 also is used on the stripper arm 9 similar to the drive arm 8 arrangement. The stripper arm belt 17 passes over four idler pulleys 18, 19, 20 and 21, all of which are mounted on plate 9a. (FIGS. 2 and 7) It should be noted that when the thread arms 6 are rotated into engagement with the film 5, two pulleys do not change position because the thread arm pivot 7 is coincident with the stationary drive pulley shaft 14 as previously mentioned. The film drive roller 23 and the film guide rollers 25, both of which are mounted on shaft 24, comprise the other permanently fixed pulley assembly. The film drive roller 23 rotates about shaft 24 on a sleeve bearing 23a which is spaced from shaft 24 by a spacer 23c, while each of the film guide rollers 25 are allowed to rotate independently about the same shaft on roller bearings 25a. As is apparent from FIG. 2, rollers 25 are the mirror image of each other and are shaped to jointly guide film 5 over roller 23 at the proper lateral position.

During operation, the stripper arm drive pulley 22 is driven in a clockwise rotation as indicated by arrow C so as to drive idler pulley 21 via stripper belt 17 also in a clockwise rotation as indicated by arrow D so that belt 17 can strip the leading end of the film away from the spool.

It is important that the film drive belt 11 provides more drive to the wound film 5 than does the stripper belt 17 which is rotating in the opposite direction at approximately twice the speed of the drive belt 11. The force applied by the film drive belt 11 is determined by the amount of rotational force applied to the drive arm 8 to urge it in a counterclockwise direction about pivot 7. This pressure must be adequate to assure that the film drive belt 11 will provide a positive drive for all film roll diameters on the spool 3 from full to near empty. The pressure applied by the stripper belt 17 is determined by the force of spring 26 which connects the stripper arm 9 to the film drive arm 8. Since the stripper arm 9 pivots about the stripper arm pivot 15, which is affixed to the common support 10 on which the drive arm 8 is mounted, the amount of pressure applied by the stripper arm 9 is determined by the force exerted by spring 26 (as the stretch of the stripper arm is minimal) which connects stripper arm 9 to drive arm 8. This force remains substantially constant irrespective of the amount of film 5 on the spool 3.

When the thread arms 6 are retracted, the lower edge of notch 16a engages the stripper arm stop 16 as previously mentioned to immediately pull stripper arm 9 back to a position which is clear of the film path. Stop 16 also provides that when the thread arms 6 are actuated, the stripper arm 9 rapidly and positively follows the film drive arm 8 as a result of the upper edge of notch 16a engaging stop 16 without having to rely on the relatively light spring 26 that couples the stripper arm 9 to the drive arm 8. It is also important to note that the length of the stripper arm belt 17 is substantially independent of the position of the thread arms 6. This is required to insure that the spring 26 and not any stretching of the stripper arm belt 17, determines the pressure of the stripper arm 9 on the film 5.

The stripping and threading sequence occurs after completion of the previously mentioned cinching cycle. The film drive arm 8 and stripper arm 9, previously pivoted into engagement with the outer periphery of the wound film 5 for the purpose of acting as a brake during the cinching operation, holds the outer convolutions of film 5 substantially stationary while the spindle 4 is operated in the rewind mode or cinching cycle. The drive for spindle 4 is stopped to terminate the cinching cycle and the thread arms 6 remain in position against the wound film 5 while the film drive belt 11 and stripper arm belt 17 begin to rotate in the directions previously indicated, so that the film drive belt 11 causes the leading edge of the film 5 to be pushed clockwise or in an unwinding direction around the spindle 4.

Three situations may occur at this time depending upon the position of the leading edge of the film, the type of film being used and the amount of curl that may be present in the film.

Figure 6:
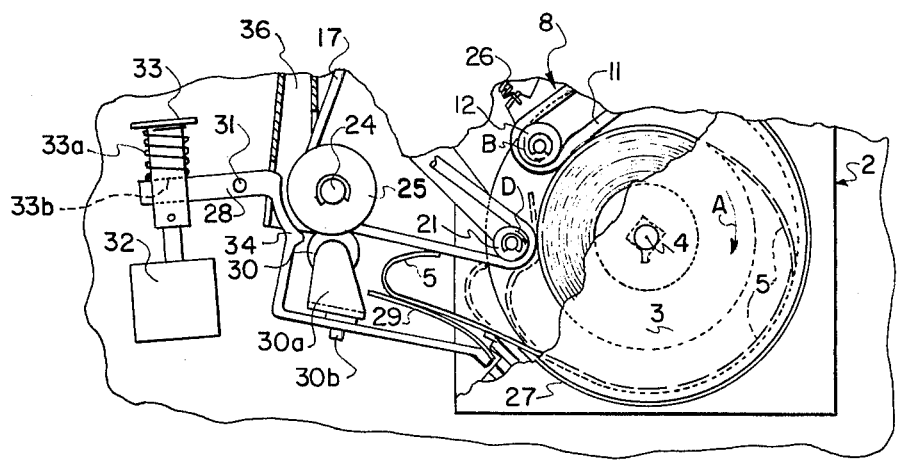
FIG. 6 is a view showing a portion of the FIG. 1 apparatus and illustrates the action of the flexible pressure ramp in preventing film fold-over or dimpling.

The first situation that may occur is that at the end of the cinching cycle, the leading edge of the film 5 may lie between the points of contact of the stripper arm belt 17 and the film drive belt 11 as shown in FIG. 6. In this event, and as a result of the fact that the stripper arm belt 17 is traveling at twice the speed of the film drive belt 11, the stripper arm belt 17 will pull the end of the film 5 backward (counterclockwise) and then force the leading edge away from the core of the wound film 5 as the spool 3 begins to rotate in response to the tractional force being applied to the wound roll of film 5 by the film drive belt 11.

The second possibility that may exist is that the leading edge of the film 5 may fall away from the core of the film as shown at the right side of the film roll in FIG. 1. In that instance, the edge will be pushed forward around the interior wall 27 of the magazine 2 in a clockwise direction until it encounters a flexible pressure ramp 29 which will guide it toward the nip formed by a thread pressure roller 30 and the stripper arm belt 17 supported by the film guide roller 23.

Figure 3:
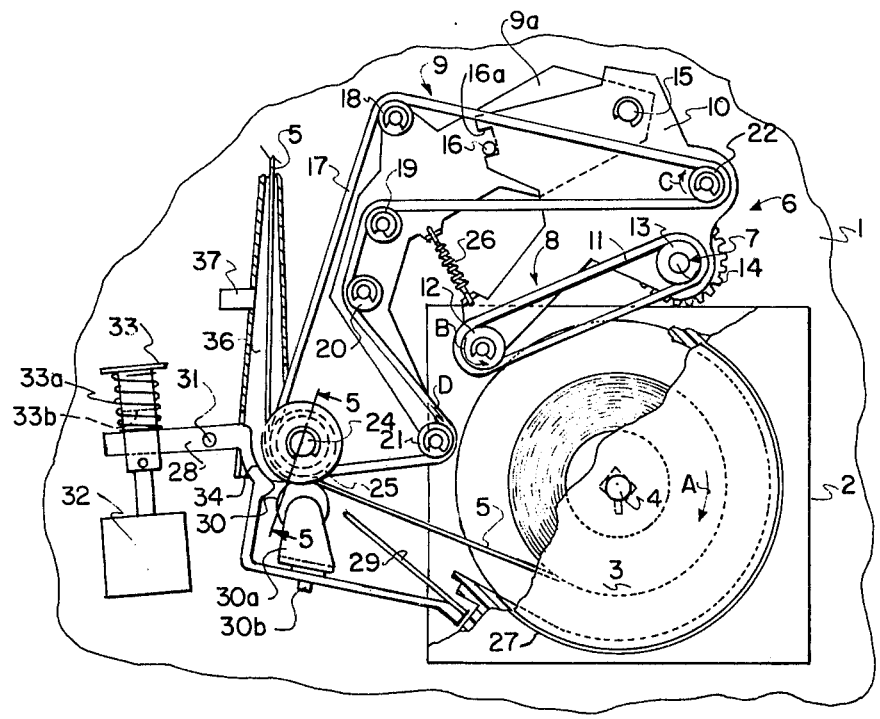
FIG. 3 is a view, similar to FIG. 1, illustrating the positions assumed by the film threading mechanism when the thread arms are in an inoperative position.
Figure 4:
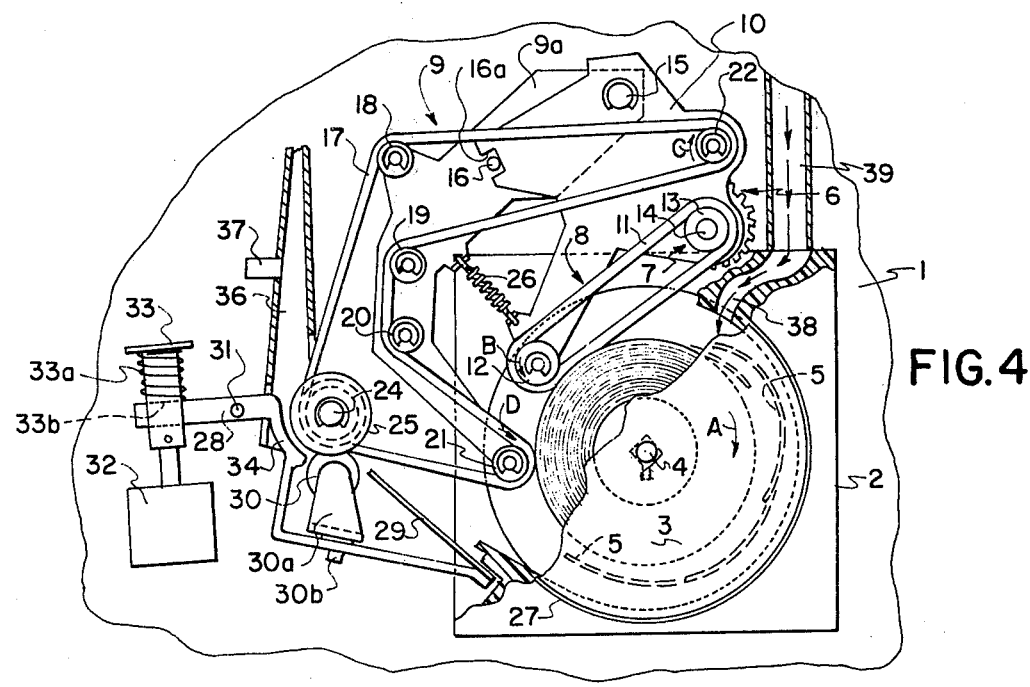
FIG. 4 is a view similar to FIG. 1 and illustrates another embodiment of the invention which utilizes a stream of air to cause the outer convolution of film to float free of the magazine wall.

In the third instance, the leading edge of the film 5 may cling to the core of the film, in which case it will travel around with the wound film in a clockwise direction until it is contacted by the stripper arm belt 17 as shown at the left side of the film roll in FIG. 1. In this case, the leading edge is stripped from the film roll by belt 17 and guided by the belt and/or ramp 29 toward the nip formed by the thread pressure roller 30 and the stripper arm belt 17 supported by the film drive roller 23. This nip is located at a point just upstream of the point at which belt 17 engages the roller 23. FIG. 6 illustrates the successive positions of the leading end portion of film that are likely to be encountered when a roll of film is being rotated in an unwind direction and the leading edge of the film stops between the points of contact of the stripper arm 9 and the film drive arm 8. The stripper arm belt 17 pulls the leading edge of the film backward (counterclockwise) while the next convolution of film is being driven forward (clockwise) by belt 11. As a result, a fold or loop may develop in the film in the space between rollers 21, 23 and ramp 29. Because of this situation, it is very important that adequate space be provided between the stripper arm belt 17 and the pressure ramp 29 for the film 5 to unfold before the leading edge of the film reaches the nip formed by but 17 and the thread pressure roller 30, otherwise folding over of the film, known as dimpling, may occur as the film 5 goes through the nip, resulting in possible film jams. Since the space between the outer convolution of film on a full spool 3 and the inside diameter of the magazine 27 is minimal and therefore cannot accept much of the film being pulled back by the stripper arm belt 17, most of the folded film must be allowed to unfold in the space between the stripper arm belt 17 and the pressure ramp 29. To insure the maximum amount of space for the film backup and at the same time to urge the leading edge of the film toward the stripper arm belt 17, the pressure ramp 29, preferably is flexible between a rest position as illustrated in FIGS. 1, 3 and 4 and a flexed position as illustrated in FIG. 6.

The pressure roller 30 is supported between two arms 30a of a U-shaped center frame or bracket. This frame, in turn, is mounted by a pivot pin 30b to one end portion 34 of a pressure roller control arm 28. This frame is adjacent the ramp 29 which also is mounted on arm portion 34. The other end portion of arm 28 fits within a slot 33b of a link 33. A coil spring 33a surrounds a central portion of link 33 and bears against control arm 28 to urge it toward the lower portion of the slot. Arm 28 is mounted for movement about a pivot 31 located intermediate its ends so that the force of spring 33a tends to move the pressure roller 30 toward film drive roller 23. A solenoid 32 is connected to the link 33 and is effective, when energized, to move the link and thus the arm 28 and roller 30 between their respective operative positions as illustrated and inoperative positions (not shown). When the solenoid is energized, the force of spring 33a determines the force applied against the film by the pressure roller 30. When the solenoid is de-energized, the weight of arm 28 causes it to pivot about pivot 31 to separate the roller 30 from the film.

Figure 2:
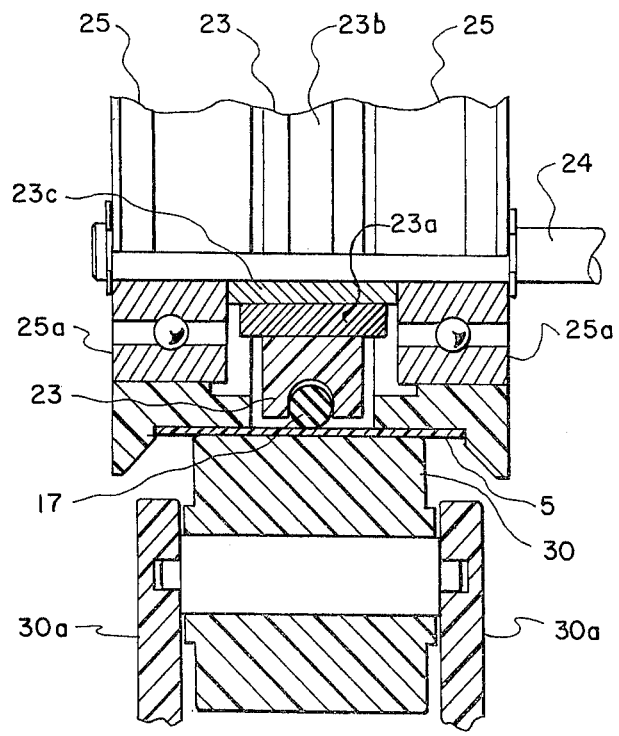
FIG. 2 is an enlarged, partial section taken generally along Line 2—2 of FIG. 1 showing the nip of the thread pressure roller and the film drive roller.

FIG. 2 illustrates in detail the nip formed by the film drive roller 23 and pressure roller 30 when the pressure roller 30 is in the operative position. It should be noted that the stripper arm belt 17 passes over the film drive roller 23 in such a manner that the stripper arm belt 17 acts as a moving guide for the leading edge of the film as it proceeds through the nip. At each side of the film drive roller 23 are located film guide rollers 25 which locate the film 5 laterally in the proper film path. The stripper belt 17 and film drive roller 23 are recessed relative to rollers 25 so that the film is supported by the film guide rollers 25 and the surface of the film will not contact the stripper belt 17 or the roller 23 as the film travels around the assembly defined by the rollers 23 and 25. This arrangement minimizes the possibility of abrasion of the film surface during the normal film transport mode when the thread pressure roller 30 is retracted because the film guide rollers 25 free wheel.

Figure 5:
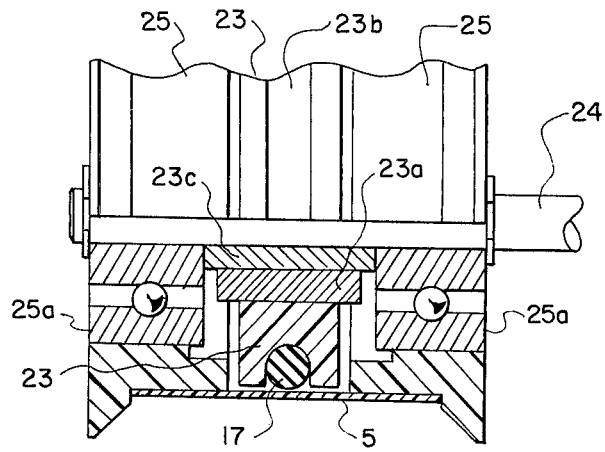
FIG. 5 is a partial section taken generally along Line 5—5 of FIG. 3 showing the position of the film on the film guide roller and the spaced relation of the film drive roller from the film after the film has passed through the nip shown in FIG. 2.
Figure 7:
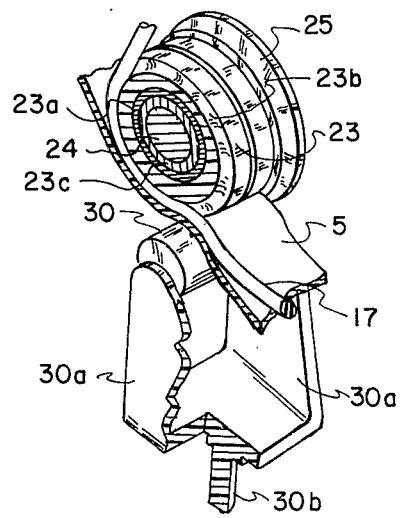
FIG. 7 is an enlarged perspective, partially in section, illustrating the manner in which the pivoted thread pressure roller engages the belt or "O" ring slightly upstream of the film path from the combination thread drive and guide roller, thereby providing positive film drive by pinching the film between the belt and the thread pressure roller.

It is important to note that the surface of film 5 only engages the stripper arm belt 17 at one position; that being at tthe nip formed by the belt and the thread pressure roller 30 as illustrated in FIG. 7. After passing through the nip, the film 5 no longer contacts the stripper arm belt 17 and is supported entirely by the film guide rollers 25 as illustrated in FIG. 5. As illustrated in FIG. 7, the thread pressure roller 30 contacts the film at a point slightly upstream of a point on the film guide rollers where the film is tangent to said roller before the pressure roller is engaged. In practice, the distance upstream (toward the film spool) from the tangency point on the guide roller that contact is made is approximately 1/8 of an inch.

As mentioned previously, the thread pressure roller 30 is mounted in a castor frame 30a and a pivot pin 30b mounts the frame on pressure roller arm 34 upstream of the thread pressure roller 30. Utilization of the castor-mounted thread pressure roller to self-align itself with the stripper arm belt 17 eliminates the side forces that are usually encountered with a fixed roller mount. The existence of any such side forces would have a tendency to "walk" the stripper arm belt 17 out of the groove 23b in the drive roller 23; which is clearly undesirable. However, during the stripping and threading cycle when the thread pressure roller 30 is in its operative position, positive film drive is provided by the motion of the stripper arm belt 17 through the nip because the film 5 is pinched between the thread pressure roller 30 and the stripper arm belt 17 (see FIG. 2 and FIG. 7).

From the nip of the thread pressure roller 30 and stripper arm belt 17, the film is driven through a guide channel 36 toward a film gate (not shown). In the channel, the film passes an optical film presence sensor 37. Sensor 37 is basically a photoelectric sensing device comprising a light source and a photocell. The light source projects a light beam across the guide channel 36. Film entering the guide channel 36 provides a reflective surface so that the light beam is reflected back toward the photocell, thereby providing a signal that is furnished to a suitable control (not shown) that causes the thread arm pivot to pivot clockwise, thus causing the film thread arms 6 to retract from a threading position to a standby position as shown in FIG. 3. The belts 11 and 17 continue to operate thereby preserving film drive at the nip of thread pressure roller 30 and stripper belt 17. Retraction of the thread arms 6 promptly after the drive defined by belt 17 and roller 30 becomes effective, insures that film wear will be kept to a minimum. Since the stripper arm belt 17 is traveling faster than the film drive arm belt 11, retraction of the thread arms 6 at this point causes the leading edge of the film 5 to accelerate to a speed which is determined by the stripper arm belt 17.

When the threading mechanism is used in conjunction with a projection system, the film would be allowed to continue through the film guiding channel 36 and past a projection gate (not shown) to a take-up reel (not shown). Once the film has reached the take-up reel, it may be sensed in a conventional manner which would produce a signal that would terminate the threading sequence by de-energizing the pressure roller arm solenoid 32 which would cause the pressure roller 30 to retract. The film guide rollers 25 would thus be allowed to free wheel as the film passes over them while the film is being transported in a conventional manner.

It is recommended that a roll of film intended for use with this thread mechanism have approximately the first 18 inches of the film free of images. If images are present on the first few inches of the film, some scuffing of the film may occur after prolonged use with this type of thread mechanism. If desired, however, a separate leader can be spliced to the leading end of the film so that only the leader is contacted by the threading mechanism.

FIG. 4 illustrates another embodiment of the present invention which utilizes a stream of air to facilitate automatic threading, and is especially useful with short lengths of thin film. When attempting to thread thin films (less than 3 mils) by using the arrangement described above, it has been found that the outer convolution of the film has a tendency to cling to the wall 27 of the magazine thereby offering resistance to the forward movement of the film 5.

In some cases, particularly when there are only a few feet of film on the core of the spool 3, it has been found that the film 5 may buckle when the leading edge clings to the magazine wall 27 and the spool 3 continues to rotate, resulting in a loop of film in the magazine and not the leading edge being driven from the magazine 2 which inhibits successful threading. Dirt buildup and static electricity have been found to be some of the reasons contributing to such a clinging action.

It has also been noted that there is a tendency for thin film to want to follow the path of the drive belt 11 which results in the film being deflected sharply when it reaches the interior wall 27 of the magazine 2 causing an undesirable bend in the film at that point which may cause permanent damage to the film.

Modification of the mechanism as shown in FIG. 4 overcomes the above-mentioned problems by providing a nozzle 38 that directs a stream of air 39 into the magazine 2 so as to float the leading edge of the film away from the wall 27 of the magazine 2. This facilitates the threading operation in several ways such as assisting in the discharge of static charges that may have built up on either the film 5 or wall 27 of the magazine 2. The air stream 39 also prevents the film 5 from following the drive belt 11 and provides a cushion of air between the film 5 and the magazine wall 27 upon which the film may ride as it moves toward the nip of the threading pressure roller 30 and the stripper arm belt 17.

It should be understood that even though the arrangements herein described have been described as performing various operations on film wound on a spool, it may be adapted to handle other types of web, strip or tape information bearing material.

The invention has been described in detail with particular reference to a preferred embodiment thereof, but it will be understood that variations and modifications can be effected within the spirit and scope of the invention.

We claim:
1. An automatic threading mechanism for removing the leading end portion from a spool of web material or the like comprising:
   a. a drive member for rotating the spool of web material in an unwinding direction;
   b. a belt for stripping said leading end portion of said web material from said spool and guiding said end portion along said belt away from said spool;
   c. means for mounting said drive member and said belt for independent movement into and out of engagement with the outer periphery of said spool of web material;
   d. means for driving said drive member in a direction for effecting movement of said spool in an unwinding direction;
   e. means for driving said belt in a direction opposite to said drive member;
   f. guide roller means for receiving said end portion of said web material after it has been stripped from the spool;
   g. pressure roller means capable of moving into engagement with said web material and forcing said web material against said belt, thereby providing a positive drive to said web material; and
   h. means for (1) sensing the presence of said end portion of said web material after it has passed between said guide roller means and said pressure roller means and (2) moving said drive member and said belt out of engagement with said spool in response to such sensing.

2. An automatic film threading mechanism as set forth in claim 1 further comprising means coupled to said drive member and said belt for controlling the forces exerted by said drive member and said belt so that said drive member exerts a substantially greater tractive force on said web material than does said belt.

3. An automatic film threading mechanism as set forth in claim 1 wherein said drive member comprises a belt and at least one pulley over which the belt is trained.

4. An automatic film threading mechanism as set forth in claim 1 wherein said sensing means comprises a photosensitive member and a light source for directing a light beam toward said photosensitive member.

5. An automatic film threading mechanism as set forth in claim 1 wherein said guide roller means has a centrally reduced portion and projecting portions at both sides of said reduced portion for engaging the film at the margins thereof.

6. An automatic film threading mechanism as set forth in claim 5 wherein said belt passes over said reduced portion of said guide roller means and said pressure roller means forces said web material against said belt as it passes over said reduced portion.

7. An automatic film threading mechanism as set forth in claim 6 wherein said projecting portion of said guide roller means is capable of rotating independently of said reduced portion.

8. An automatic film threading mechanism as set forth in claim 6 wherein said guide roller means rotates about a fixed axis.

9. A device for taking up the leading end from a spool of wound web material comprising:
   a. first and second rotary members;

b. means for driving said first member in a first direction;

c. means for driving said second member in a direction opposite to said first member;

d. a movable support on which said members are independently mounted, said support being movable to bring the members into and out of engagement with the outer convolution of said wound web material whereby said first member drives said spool in an unwinding direction, said second member strips away the leading end of said wound web material from the sub-adjacent convolute of said wound web material and guides said end away from said spool;

e. means coupled to said first member and said second member for controlling the forces exerted by said first member and said second member so that said first member exerts a substantially greater tractive force on said web material, than does said second member;

f. means for guiding said stripped end portion of said web material from said second member;

g. means for sensing the presence of said leading end of said web material of said guiding means; and h. means coupled to said sensing means and to said movable support for retracting said first and second members from engagement with said spool when the presence of said leading end is sensed.

10. The invention as set forth in claim 9 further comprising a magazine in which said spool of web material is housed, said magazine having an interior wall and means for directing a stream of air between said wall and said web material thereby causing said web material to float free of said wall.

11. An automatic threading mechanism for removing the leading end portion of film from a spool of film or the like comprising:

a. drive belt means including a drive belt and means for driving said drive belt for rotating the spool of film in an unwinding direction when engaged with the outer periphery of said spool of film;

b. stripper belt means for stripping said leading end portion of said web material from said spool of film when engaged with the outer periphery of said spool of film and guiding said end portion along said belt away from said spool of film;

c. means for mounting said drive belt means and said stripper belt means for movement into and out of engagement with the outer periphery of said spool of film so that said drive belt means exerts a substantially greater tractive force on said film than does said stripper belt means;

d. means for driving said stripper belt means in a direction opposite to said drive belt means at substantially twice the speed of said drive belt;

e. a flexible ramp adjacent a portion of said stripper belt for assisting said stripper belt in guiding the leading end portion of said film therebetween;

f. guide roller means having a centrally reduced portion and a projecting portion at both sides of said reduced portion for engaging the film at the margins thereof, said reduced portion being rotatable independent of said projecting portion and being driven by said stripper belt;

g. pressure roller means capable of moving into engagement with said stripper belt so as to pinch said film therebetween and impart positive drive to said film;

h. means for sensing the presence of said end portion of said web material to produce a first signal; and i. said mounting means moving said drive belt means and said stripper belt means out of engagement with said spool of film in response to said first signal.

12. An automatic film threading mechanism as set forth in claim 11 wherein said pressure roller means comprises a castor mounted pressure roller, said castor mounted roller being self-aligning with said stripper belt.

13. An automatic film threading mechanism as set forth in claim 11 further comprising a spindle on which said film spool is positioned, said drive belt and said stripper belt after having been rotated into engagement with the periphery of said film spool are initially held stationary thereby providing a braking action when said drive spindle rotates said film spool in the rewind direction.

* * * * *

UNITED STATES PATENT OFFICE
CERTIFICATE OF CORRECTION

PATENT NO. : 3,991,955

DATED : November 16, 1976

INVENTOR(S) : Bruce E. Crayton    Ronald A. Phillips

It is certified that error appears in the above-identified patent and that said Letters Patent are hereby corrected as shown below:

Column 1, line 9    after "known", change "are" to --and--

Column 5, line 28   change "but" to --belt--

Column 6, line 17   after "at", change "tthe" to --the--

Signed and Sealed this

Eighth Day of February 1977

[SEAL]

Attest:

RUTH C. MASON
*Attesting Officer*

C. MARSHALL DANN
*Commissioner of Patents and Trademarks*